United States Patent [19]

Takeuchi

[11] Patent Number: 4,459,667

[45] Date of Patent: Jul. 10, 1984

[54] GUIDANCE METHOD AND SYSTEM FOR AN AUTOMOTIVE VEHICLE

[75] Inventor: Yasuhisa Takeuchi, Yokosuka, Japan

[73] Assignee: Nissan Motor Company, Limited, Yokohama, Japan

[21] Appl. No.: 356,759

[22] Filed: Mar. 10, 1982

[30] Foreign Application Priority Data

Mar. 28, 1981 [JP] Japan ................................. 56-44704

[51] Int. Cl.³ ............................................ G06F 15/50
[52] U.S. Cl. ..................................... 364/424; 343/389; 343/457; 364/449; 364/450; 364/452
[58] Field of Search ............... 364/424, 443, 449, 450, 364/452, 453; 343/450, 451, 454, 456, 457, 389

[56] References Cited

U.S. PATENT DOCUMENTS

| 3,630,079 | 12/1971 | Hughes et al. | 73/178 R |
|---|---|---|---|
| 3,919,529 | 11/1975 | Baker et al. | 364/451 |
| 3,941,984 | 3/1976 | Chappell et al. | 364/452 |
| 4,107,689 | 8/1978 | Jellinek | 343/457 |
| 4,114,437 | 9/1978 | Krogmann | 73/178 R |
| 4,318,105 | 3/1982 | Brodeur | 364/452 X |
| 4,359,733 | 11/1982 | O'Neill | 364/424 X |
| 4,416,017 | 11/1983 | Jasper et al. | 364/452 X |

FOREIGN PATENT DOCUMENTS 6448 1/1980 European Pat. Off. .

OTHER PUBLICATIONS

Lezniak et al., "A Dead Reckoning/Map Correlation System for Automatic Vehicle Tracking," IEEE Transactions on Vehicular Technology, vol. VT-26, No. 1, Feb. 1977.

Primary Examiner—Felix D. Gruber
Assistant Examiner—Ronni S. Malamud
Attorney, Agent, or Firm—Schwartz, Jeffery, Schwaab, Mack, Blumenthal & Koch

[57] ABSTRACT

A guidance method and system for an automotive vehicle which switches from an electronic navigational signal method to a dead reckoning method when any of the field strengths of three navigational electromagnetic wave signals drops below a predetermined lower limit or vice versa when the field strengths of the three navigational electromagnetic wave signals all exceed the lower limit. Therefore, even if the navigational wave signals are obstructed by buildings or mountains, it is possible to continuously determine and display the vehicle position. The guidance system according to the present invention comprises a receive-state detection unit for detecting three field strengths and for comparing the detected field strengths with a predetermined lower limit, and a selector for selectively outputting vehicle position signals on the basis of navigational signals or dead reckoning, in addition to the conventional electronic navigation system and dead reckoning system.

10 Claims, 14 Drawing Figures

| Lat | 60400 | | 60410 | | 60420 | | 60430 | | 60440 | | Long |
|---|---|---|---|---|---|---|---|---|---|---|---|
| ° ′ N | ° ′ | Δ | ° ′ | Δ | ° ′ | Δ | ° ′ | Δ | ° ′ | Δ | ° |
| 21 N | 135 44.4E | —10 | 135 45.4E | —11 | 135 46.6E | —11 | 135 47.7E | —11 | 135 48.8E | —10 | |
| 22 N | 135 46.5E | —10 | 135 47.6E | —10 | 135 48.7E | —10 | 135 49.7E | — 9 | 135 50.7E | —10 | |
| 23 N | 135 50.3E | — 9 | 135 51.2E | — 9 | 135 52.2E | — 9 | 135 53.2E | — 9 | 135 54.2E | — 9 | |
| 24 N | 135 55.8E | — 9 | 135 56.7E | — 9 | 135 57.7E | — 9 | 135 58.6E | — 9 | 135 59.5E | — 9 | |
| 25 N | 136 03.6E | — 9 | 136 04.5E | — 9 | 136 05.4E | — 9 | 136 06.3E | — 9 | 136 07.2E | — 9 | |
| 26 N | 136 13.9E | — 9 | 136 14.8E | — 9 | 136 15.7E | — 9 | 136 16.7E | — 9 | 136 17.6E | — 9 | |
| 27 N | 136 27.0E | — 9 | 136 27.9E | — 9 | 136 28.9E | — 9 | 136 29.9E | — 9 | 136 30.8E | — 9 | |
| 28 N | 136 42.8E | —10 | 136 43.7E | — 9 | 136 44.7E | —10 | 136 45.8E | —10 | 136 46.8E | —10 | |
| 29 N | 137 00.9E | —11 | 137 02.0E | —11 | 137 03.1E | —11 | 137 04.2E | —11 | 137 05.3E | —11 | |
| 30 N | 137 21.2E | —12 | 137 22.4E | —12 | 137 23.7E | —11 | 137 25.0E | —12 | 137 26.2E | —12 | |
| 31 N | 137 43.5E | —13 | 137 44.9E | —13 | 137 46.3E | —13 | 137 47.6E | —13 | 137 48.9E | —13 | |
| 32 N | 138 07.4E | —15 | 138 08.9E | —15 | 138 10.4E | —14 | 138 11.9E | —15 | 138 13.5E | —15 | |
| 33 N | 138 32.8E | —16 | 138 34.4E | —16 | 138 36.1E | —16 | 138 37.8E | —17 | 138 39.6E | —16 | |
| 34 N | 138 59.5E | —18 | 139 01.3E | —18 | 139 03.2E | —18 | 139 05.1E | —19 | 139 07.0E | —18 | |
| 35 N | 139 27.4E | —20 | 139 29.5E | —21 | 139 31.6E | —20 | 139 33.6E | —20 | 139 35.6E | —20 | |
| 36 N | 139 56.6E | —22 | 139 58.9E | —23 | 140 01.2E | —22 | 140 03.4E | —22 | 140 05.6E | —22 | |
| 37 N | 140 27.0E | —24 | 140 29.4E | —24 | 140 31.9E | —24 | 140 34.4E | —25 | 140 36.9E | —24 | |
| 38 N | 140 58.4E | —26 | 141 01.2E | —27 | 141 03.9E | —27 | 141 06.6E | —26 | 141 09.3E | —27 | |
| 39 N | 141 31.3E | —29 | 141 34.2E | —28 | 141 37.1E | —29 | 141 40.0E | —29 | 141 43.0E | —29 | |
| 40 N | 142 05.3E | —31 | 142 08.4E | —31 | 142 11.5E | —31 | 142 14.8E | —32 | 142 18.0E | —32 | |
| T | 60400 | | 60410 | | 60420 | | 60430 | | 60440 | | T |

INTERSECTION LONG  
INTERPOLATION CONSTANT $Y_1$  
$Y_2$

| Lat | 35700 | Δ | 35720 | Δ | 35740 | Δ | 35760 | Δ | 35780 | Δ | Long |
|---|---|---|---|---|---|---|---|---|---|---|---|
| | 34 43.7N | 8 | 34 42.0N | 8 | 34 40.2N | 8 | 34 38.5N | 8 | 34 36.7N | 8 | 147 E |
| | 34 48.6N | 8 | 34 46.9N | 8 | 34 45.2N | 8 | 34 43.5N | 8 | 34 41.8N | 8 | 146 E |
| | 34 53.7N | 8 | 34 52.0N | 8 | 34 50.3N | 8 | 34 48.6N | 8 | 34 47.0N | 8 | 145 E |
| | 34 58.8N | 8 | 34 57.1N | 7 | 34 55.5N | 8 | 34 53.8N | 8 | 34 52.2N | 8 | 144 E |
| | 35 04.0N | 8 | 35 02.4N | 8 | 35 00.8N | 8 | 34 59.2N | 8 | 34 57.5N | 8 | 143 E |
| | 35 09.5N | 8 | 35 07.9N | 8 | 35 06.3N | 8 | 35 04.7N | 8 | 35 03.0N | 8 | 142 E |
| | 35 15.3N | 8 | 35 13.6N | 8 | 35 11.9N | 8 | 35 10.3N | 8 | 35 08.7N | 8 | 141 E |
| | 35 21.1N | 8 | 35 19.4N | 8 | 35 17.7N | 8 | 35 16.0N | 8 | 35 14.4N | 8 | 140 E |
| | 35 27.0N | 8 | 35 25.3N | 8 | 35 23.6N | 8 | 35 21.9N | 8 | 35 20.1N | 8 | 139 E |
| | 35 33.0N | 8 | 35 31.2N | 8 | 35 29.5N | 8 | 35 27.8N | 8 | 35 26.0N | 8 | 138 E |
| | 35 39.1N | 9 | 35 37.2N | 9 | 35 35.4N | 9 | 35 33.6N | 9 | 35 31.8N | 9 | 137 E |
| | 35 45.1N | 9 | 35 43.2N | 9 | 35 41.4N | 9 | 35 39.4N | 9 | 35 37.5N | 9 | 136 E |
| | 35 51.1N | 9 | 35 49.1N | 9 | 35 47.1N | 9 | 35 45.1N | 9 | 35 43.1N | 9 | 135 E |
| | 35 56.9N | 10 | 35 54.8N | 10 | 35 52.7N | 10 | 35 50.7N | 10 | 35 48.6N | 10 | 134 E |
| | 36 02.5N | 11 | 36 00.3N | 10 | 35 58.2N | 10 | 35 56.0N | 10 | 35 53.8N | 10 | 133 E |
| | 36 07.9N | 11 | 36 05.6N | 11 | 36 03.4N | 11 | 36 01.1N | 11 | 35 58.8N | 11 | 132 E |
| | 36 13.1N | 11 | 36 10.7N | 11 | 36 08.3N | 11 | 36 05.9N | 11 | 36 03.6N | 11 | 131 E |
| | 36 17.9N | 12 | 36 15.4N | 12 | 36 12.9N | 12 | 36 10.5N | 12 | 36 08.0N | 12 | 130 E |
| | 36 22.4N | 13 | 36 19.8N | 13 | 36 17.2N | 12 | 36 14.7N | 12 | 36 12.1N | 13 | 129 E |
| | 36 26.6N | 13 | 36 23.9N | 13 | 36 21.2N | 13 | 36 18.5N | 13 | 36 15.8N | 13 | 128 E |

GUIDANCE METHOD AND SYSTEM FOR AN AUTOMOTIVE VEHICLE

BACKGROUND OF THE INVENTION

1. Field of the Invention

The present invention relates generally to a guidance method and system by which the position of a moving automotive vehicle can be detected and indicated on a map on a display unit, and more specifically to a guidance method and system by which a conventional electronic navigation method and a dead reckoning method are alternated according to variations in the field strength of navigational electromagnetic wave signals.

2. Description of the Prior Art

For automotive vehicle guidance, it is possible to employ two methods: dead reckoning and navigational electromagnetic wave signals.

In the dead reckoning method, the direction in which a vehicle is travelling and the distance over which the vehicle has travelled are continuously detected beginning from a start point of the vehicle, and the position of the vehicle is displayed on a map on a display unit after appropriate calculations have been executed. In this method, however, it is usually difficult to accurately detect vehicle positions, that is, there inevitably exist errors in detection of vehicle position. Furthermore, the errors usually accumulate as the travel distance increases.

On the other hand, in the navigational electromagnetic wave signal method, known as loran A, loran C, Decca, Omega, etc., the difference in receive time between navigational electromagnetic wave signals synchronously transmitted from at least three fixed stations are detected, and the position of the vehicle is displayed on a map on a display unit in the same manner as in dead reckoning, after the intersection of two hyperbolas obtained in accordance with detected differences in receive times has been calculated. In this method, the accuracy in position detection is superior to that in the dead reckoning method; however, when the field strength of any of the three navigational electromagnetic wave signals is obstructed by a building or a mountain, it is impossible to receive all of the navigational wave signals, necessary to determine the vehicle position.

A more detailed description of these prior-art vehicle guidance methods will be described hereinafter with reference to the attached drawings under DETAILED DESCRIPTION OF THE PREFERRED EMBODIMENTS.

SUMMARY OF THE INVENTION

With these problems in mind, therefore, it is the primary object of the present invention to provide a vehicle guidance method and system which automatically switches from the navigational electromagnetic wave signal method to the dead reckoning method when any one of the field strengths of three navigational wave signals drops below a predetermined level, and automatically switches back to the navigational electromagnetic wave signal method when the field strengths of three navigational signals all exceed the predetermined level.

To achieve the above-mentioned object, the vehicle guidance method according to the present invention comprises the step of detecting vehicle positions on the basis of navigational electromagnetic wave signals, in which three navigational electromagnetic wave signals are received, the differences in receive time between two pairs of the three navigational wave signals are determined, two hyperbolas are determined in accordance with the detected differences, and the point of intersection of two determined hyperbolas is calculated; the step of detecting vehicle position on the basis of dead reckoning, in which vehicle orientation and vehicle speed are detected, and vehicle travel distance is calculated in accordance with the detected vehicle orientation, vehicle speed and time; the step of determining the state of the received field strengths of three navigational electromagnetic wave signals in which the detected field strengths are compared to a predetermined lower limit; a step of switching from the navigational electromagnetic wave signal method to the dead reckoning method or vice versa depending upon the state of the received field strengths of the navigational wave signals.

Further in the present invention, the navigational electromagnetic wave signal method is employed predominantly and the dead reckoning method is secondarily adopted only when navigational electromagnetic wave signals are weak.

To achieve the above-mentioned object, the vehicle guidance system according to the present invention comprises a receive-state detection unit for detecting the field strengths of three navigational wave signals, for comparing the detected field strengths to a predetermined lower limit, and for outputting a signal enabling the dead reckoning system when any one of the detected field strengths is below the lower limit, a selector for selecting the appropriate method in response to the output signal generated from the receive state detection unit, in addition to one system for detecting vehicle position on the basis of navigational electromagnetic wave signals and the other system for detecting vehicle position on the basis of vehicle orientation and vehicle speed, that is, dead reckoning.

BRIEF DESCRIPTION OF THE DRAWINGS

The features and advantages of the vehicle guidance method and system according to the present invention will be more clearly appreciated from the following description taken in conjunction with the accompanying drawings in which like reference numerals designate corresponding elements and in which:

FIGS. 5(a) and (b) are sample tables used for the navigational electromagnetic wave signal method known as loran C, published by U.S. Navy;

DETAILED DESCRIPTION OF THE PREFERRED EMBODIMENTS

To facilitate understanding of the present invention, a brief reference will be made to conventional vehicle guidance methods, that is, dead reckoning method and navigational electromagnetic wave signal method with reference to the attached drawings.

First, dead reckoning method will be described. In this method, the direction in which a vehicle is travelling, the distance over which the vehicle has travelled and the current vehicle speed are continuously detected beginning from the starting point of the current journey, and the position of the vehicle is displayed on a map display unit after certain calculations have been executed.

Figure 1:
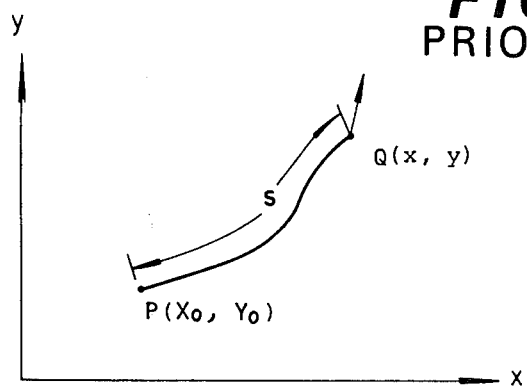
FIG. 1 is a graphical representation for assistance in explaining dead reckoning method, that is, a method of calculating a vehicle position on the basis of vehicle orientation $\theta$ and vehicle travel distance s or vehicle speed.

As shown in FIG. 1 in more detail, the current vehicle position Q (x, y) can be derived from the following expressions:

$$x = x_o + \int_o^s \cos \theta ds$$

$$y = y_o + \int_o^s \sin \theta ds$$

where coordinates $(x_o, y_o)$ indicate the starting position P on a display surface, $\theta$ is the instantaneous vehicle orientation at each point along the vehicle path.

Here, the distances can be obtained by integrating vehicle speed with respect to time or by detecting and counting the revolutions of the vehicle wheels. The orientation $\theta$ can be detected by a gyro-compass or a magnetic compass mounted on a vehicle.

By the way, in the method of detecting a vehicle position on the basis of vehicle orientation $\theta$ and vehicle travel distance s, there inevitably exist some detection errors due to orientaton detection means and travel distance detection means. As a result, systematic detection error accumulates with increasing travel distance, and the vehicle position Q(x, y) calculated on the basis of the above-mentioned expression will deviate increasingly from the actual vehicle position.

To overcome this problem, the following method has been proposed: some check points are previously determined along the vehicle travel course; when the vehicle passes through the check points, the calculation values are erased in order to be set to the coordinates of the check point as a new intial value $(x_o, y_o)$. In this method, however, it is very difficult to determine whether or not the vehicle passes through a predetermined position corresponding to a check point on a map, thus resulting in complicated operations.

Next, the navigational electromagnetic wave signal method will be described. In this method, as is well known as loran A, loran C, Decca, Omega, etc., the difference in receive time between navigational electromagnetic wave signals synchronously transmitted from at least three fixed stations are detected, and the position of the vehicle is displayed on a map display unit in the same manner as in dead reckoning, after the intersection of two hyperbolas obtained in accordance with the detected difference in receive time has been calculated. The accuracy in position detection the basis of the navigational wave signals is better than in the dead reckoning method.

Figure 2:
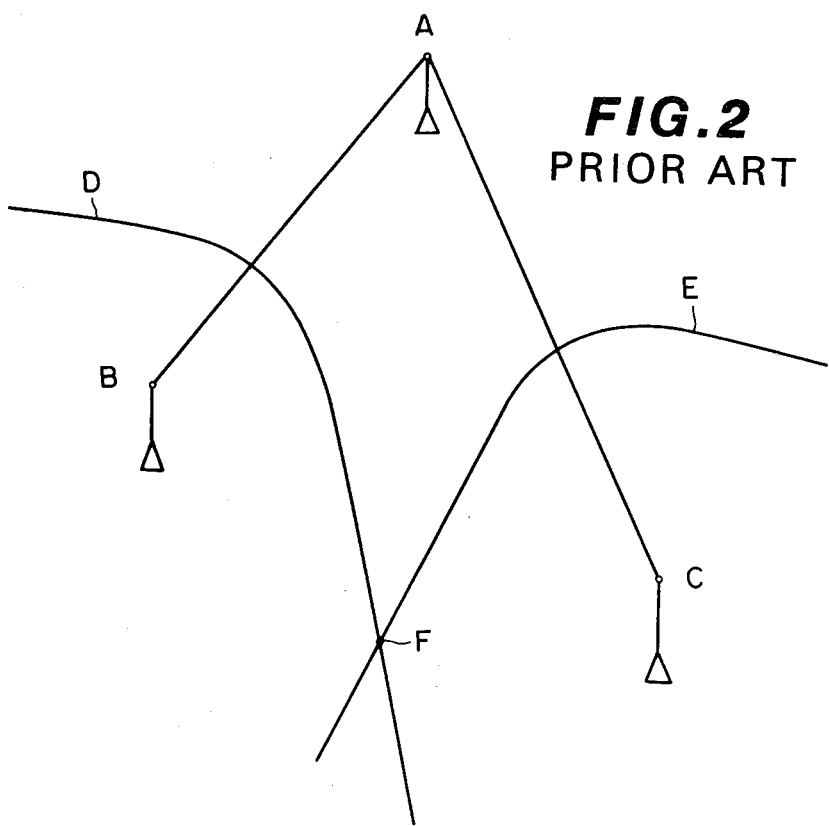
FIG. 2 is a graphical representation for assistance in explaining the navigational electromagnetic wave signal method, that is, a method of calculating a vehicle position on the basis of the difference in receive time between navigational electromagnetic wave signals synchronously transmitted from three fixed stations.

As shown in FIG. 2, the method of detecting vehicle positions on the basis of navigational signals utilizes the differences in receive time between three electromagnetic wave signals (pulse waves) synchronously transmitted from at least three fixed stations A, B and C. In more detail, if the difference in receive time between electromagnetic wave signals transmitted from the station A and that from the station B is $\Delta t_1$, the position where the time difference $\Delta t_1$ is produced must be located along a first hyperbola D symmetric about the straight line A-B (a first basic line). Similarly if the difference in receive time between electromagnetic wave signals transmitted from the station A and that from the station C is $\Delta t_2$, the position where the time difference $\Delta t_2$ is produced must be located along a second hyperbola E symmetric about the straight line A-C (a second basic line). Therefore, when the time difference between stations A and B is $\Delta t_1$ and the time difference between statins A and C is $\Delta t_2$, it is possible to detect the position where the signals are received, that is, the point F of intersection of the two hyperbolas D and E.

However, since the above-mentioned navigational electromagnetic wave signal method was intended originally for shipping or aircraft, the fixed stations are usually located near seashores or on the tops of mountains where electromagnetic wave signals are unobstructed over long distances. Therefore, in the case when the position of a vehicle which is travelling on land is to be detected on the basis of navigational electromagnetic wave signals, the signals are often obstructed by buildings when the vehicle is travelling in a city or by mountains when the vehicle is traveling in the country.

When no electromagnetic wave signal is received from the fixed station B in FIG. 2, since the hyperbola D can not be determined, it is impossible to detect the position of the vehicle until the electromagnetic wave signals can be received again.

Now will be described the guidance system for an automotive vehicle according to the present invention with reference to the attached drawings.

Figure 3:
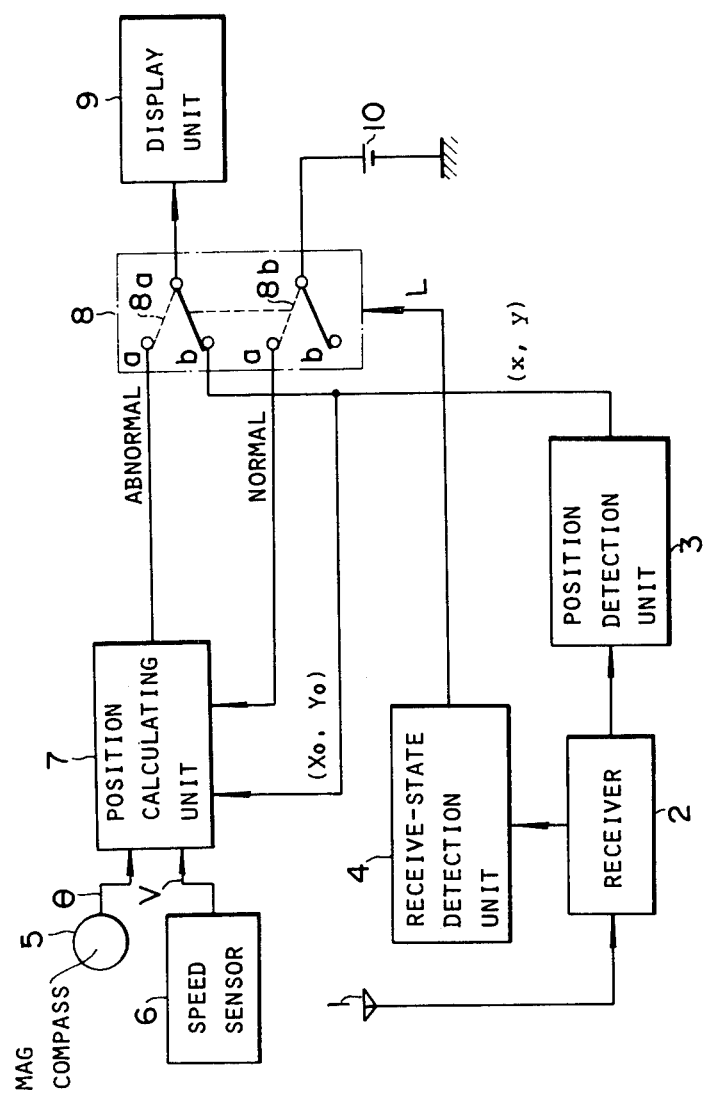
FIG. 3 is a schematic block diagram of a first embodiment of the vehicle guidance system according to the present invention, in which navigational electromagnetic wave signal method is replaced by dead reckoning method when a receive-state detection unit detects an abnormal field strength.

FIG. 3 is a schematic block diagram of a first embodiment of the vehicle guidance system according to the present invention. First, the system configuration will be explained. The reference numeral 1 denotes a receiving antenna for receiving navigational electromagnetic wave signals, the numeral 2 denotes a receiver suitable for use with the system of loran A, loran C, Decca, Omega, etc. for receiving and reproducing navigational electromagnetic wave signals (pulse signals) synchronously transmitted from at least three fixed station and received by the receiving antenna 1, so that the difference in receive times can be detected. The reference numeral 3 denotes a position detection unit for calculating the position coordinate (x, y) of the point of intersection of two hyperbolas determined on the basis of the difference in receive time at the receiving unit 2. The numeral 4 denotes a receive-state detection device for generating a H-voltage output signal when any one of the three field strengths of the received signals is weak, and a L-voltage output signal when the field strengths of the three received signals are all strong. These elements are used for detecting vehicle position on the basis of navigational electromagnetic wave signals.

In addition, the reference numeral 5 denotes a magnetic compass for detecting the travel orientation $\theta$ of a vehicle and outputting a signal corresponding thereto, the reference numeral 6 denotes a vehicle speed sensor for outputting a voltage singal proportional to vehicle speed V or a pulse signal, the frequency of which is proportional to vehicle speed V, and the reference numeral 7 denotes a position calculating unit for calculating vehicle travelling course beginning from the initial position $(x_o, y_o)$ previously preset therein and outputting a signal indicative of the current vehicle position (x, y).

This position calculating unit 7 outputs the current position (x, y) by executing the following calculation expressions on the basis of vehicle travel distance ds (=V dt) obtained from vehicle speed V and vehicle orientation $\theta$:

$$x = x_o + \int_o^s \cos \theta ds$$

$$y = y_o + \int_o^s \sin \theta ds$$

Further, as described later, initial values $(x_o, y_o)$ are sequentially stored in the position calculating unit 7 by continuously updating them with the positions (x, y) detected by the position detection unit 3. In the normal case in which vehicle position is detected via the navigational electromagnetic wave signals, the position calculation is not executed in the position calculating unit 7.

The reference numeral 8 denotes a selector to switch the output signal from the position detection unit 3 to the one from the position calculating unit 7 or vice versa in response to the output signal from the receive-state detecting unit 4, having two movable contacts 8a and 8b acting as a double-pole, single-throw switch. The movable contact 8a switches the output signal from the position detection unit 3 to that from the position calculating unit 7 or vice versa. The movable contact 8b supplies power from a DC power supply 10 to the position calculating unit 7 to enable calculation operations therein when set to the a-side position as shown by a dashed line in FIG. 3 and no voltage from a DC power supply 10 to the position calculating unit 7 to disable the calculation operations when set to the b-side position. Further, the selector 8 is switched to the a-side when the receive-state detection unit 4 outputs a H-voltage signal (abnormal signal reception) and to the b-side when the receive-state detection unit 4 outputs a L-voltage signal (normal signal reception). In this embodiment, it is also possible to use a semiconductor switch such as a FET or a TTL IC for the selector switch 8 instead of mechanical contacts such as relay contacts shown in the figure.

The reference numeral 9 denotes a display unit such as a Braun tube of scanning line type, liquid crystal panel, plasma display of dot-matrix type, etc., which indicates a vehicle position by means of a brighter spot on a map displayed on the display surface according to the vehicle position signal (x, y) obtained via the selector switch 8.

Now follows a description of the operation of the first embodiment according to the present invention.

First, in the case where the respective received field strengths of the navigational electromagnetic wave signals transmitted from three fixed stations exceed a predetermined level, the receive-state detection unit 4 determines a normal receive state and outputs a L-voltage output signals. Therefore, the selector contacts 8a and 8b of the selector 8 are set to the b-side as shown by solid-lines in FIG. 3, with the result that a power from the DC power supply 10 is not supplied to the position calculating unit 7 and the calculation operations are not executed therein.

The three navigational electromagnetic wave signals transmitted from three fixed stations and received via the receiving antenna 1 are reproduced through the receiver 2 in order to detect the differences in receive time between respective electromagnetic wave signals. Thereafter, the position detection unit 3 determines two hyperbolas in accordance with the differences in receive time between two pairs of fixed stations, and outputs an intersection coordinate data signal (x, y) as a vehicle position detection signal. This position signal is inputted to the display unit 9 through the selector contact 8a switched to the b-side, so that the coordinate data are displayed on a map in accordance with the position detection signal (x, y) generated by the position detection unit.

Furthermore, in this embodiment, the position detection signals (x, y) from the position detection unit 3 are simultaneously applied to the position calculating unit 7 so as to be used as initial values in the dead reckoning method.

Next, in the case where any of the received field strengths of three navigational electromagnetic wave signals transmitted from three fixed stations is below a predetermined level, the receive-state detection unit 4 determines an abnormal receive-state and outputs a H-voltage output signal. Therefore, the selector contacts 8a and 8b of the selector 8 are set to the a-side, with the result that the position detection signal (x, y) from the position detection unit 3 is not inputted to the display unit 9. At the same time, power is supplied from the DC power supply 10 to the position calculating unit 7 through the selector contact 8b, so that the position calculating unit begins to operate on the basis of the above-mentioned expressions, that is, the dead reckoning method is restarted.

In more detail, when the selector 8 is switched to the a-side, a vehicle position (x, y) is calculated and outputted in accordance with a signal $\theta$ representative of vehicle orientation detected by the magnetic compass 5 and a signal V representative of vehicle speed detected by the vehicle speed sensor 6. The vehicle position (x, y) is next displayed on the display unit 9 through the selector contact 8a of the selector 8.

Therefore, if it is impossible to detect vehicle position on the basis of three navigational electromagnetic wave signals, it is possible to display vehicle position in accordance with the calculations on the basis of vehicle speed V and vehicle orientation $\theta$, so-called dead reckoning. As a result, even if the vehicle travels through a city or in mountains where it is difficult to receive sufficiently strong navigational signals, the travel course of a vehicle can be continuously displayed on the map.

On the other hand, when navigational electomagnetic wave signals return to a normal received field strength after the system has been switched to the dead reckoning method, since the output signal of the receive-state detection unit 4 returns to a L-voltage, the selector contacts 8a and 8b of the selector 8 are automatically returned to the b-side, so that vehicle position is determined by way of the navigational electromagnetic wave signal method. Therefore, position calculation by dead reckoning does not continue over a great vehicle travel distance, so that no excessive calculation errors accumulate.

Furthermore, the receive-state detection unit 4 for switching the selector 8 is designed with so-called hysteresis characteristics, so that the unit 4 outputs a H-voltage signal when any one of the field strength drops below a predetermined level and a L-voltage signal when the field strength recovers and exceeds another predetermined level higher than the above-mentioned one, so that it is possible to prevent spurious switching due to fluctuations of the field strengths of received electromagnetic wave signals near the predetermined level, that is, to improve the stability of switch-over.

Although the operations of the first embodiment according to the present invention have been roughly described hereinabove, a more detailed description will be made hereinbelow of the navigational electromagnetic wave signal method.

As the receiver 2, it is possible to use a loran-C receiving unit which is now on sale for shipping use. In addition, as the receive-state detection unit 4, a level alarm section provided in the loran C receiving unit can be used. The conventional loran-C receiving unit currently on sale can detect the field strengths of navigational electromagnetic wave signals transmitted from previously determined fixed stations and can output time-difference data signals to display vehicle positions on the map.

Figure 4:
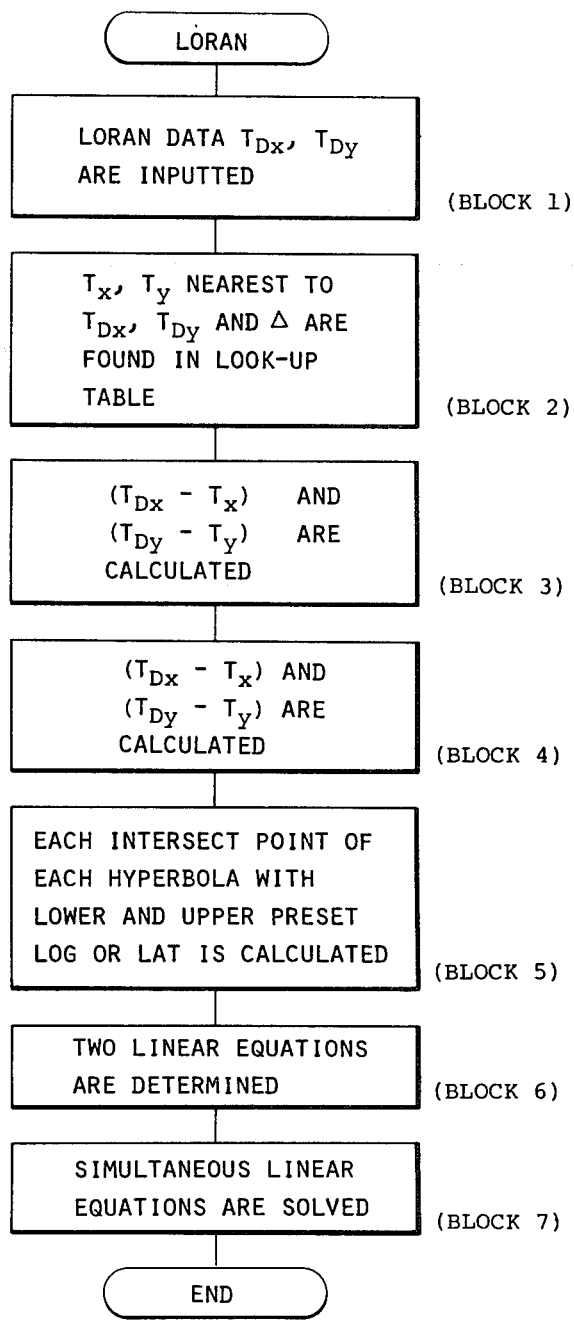
FIG. 4 is a flowchart for calculating vehicle position on the basis of three navigational electromagnetic wave signals according to the loran C method.

Now follows a description of the position detection unit 3 configured by a microcomputer for calculating vehile position (x, y) depending upon the differences in receive time between three navigational wave signals, with reference to the flowchart shown in FIG. 4.

First, two loran data $T_{Dx}$ and $T_{Dy}$ are inputted to the unit 3, where $T_{Dx}$ is the difference in receive time between the master station and x-station and $T_{Dy}$ is the difference in receive time between the master station and y-station, as shown in block 1.

Next, two representative values $T_x$ and $T_y$ nearest to the two inputted loran data $T_{Dx}$ and $T_{Dy}$ are found in a look-up table.

On the other hand, since the current, approximate vehicle position has previously been inputted to the system in such a way that the range of longitude is within $X_1-X_2$, and the range of latitude is within $Y_1-Y_2$, two intersections of $T_x$ with $X_1$, $X_2$ are searched in the table as a vehicle longitude range and two intersections of $T_y$ with $Y_1$, $Y_2$ are also searched in the table as a vehicle latitude range, as indicated in block 2.

Next, the searched point is next corrected in interpolation method. That is, $(T_{Dx}-T_x)\Delta$ or $(T_{Dy}-T_y)\Delta$ is calculated, as shown in blocks 3 and 4, where $\Delta$ is the interpolation constant obtained in the table in the same way as in $T_x$ or $T_y$.

Figure 6:
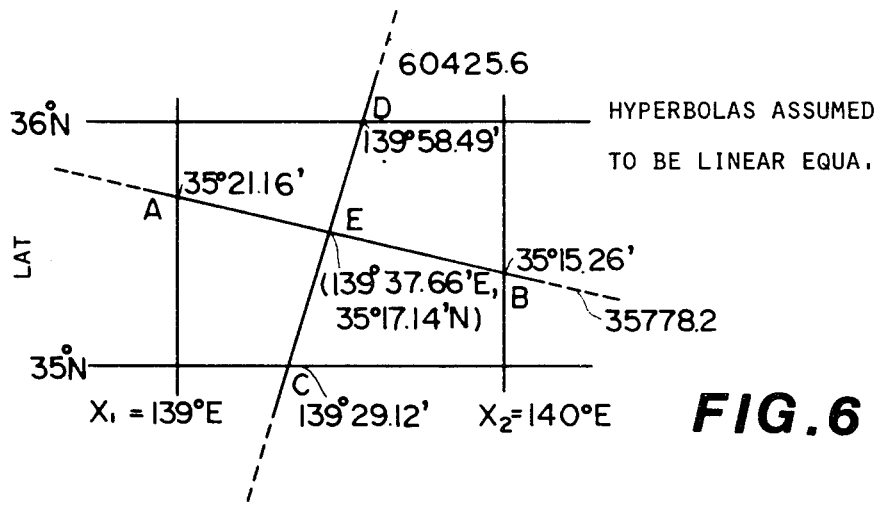
FIG. 6 is a graphical representation for assistance in explaining the interpolation procedure of the navigational electromagnetic wave signal method.

Next, two intersection points (A and B) of the hyperbola with the lower preset longitude and the upper preset longitude and two intersection points (C and D) of the hyperbola with the lower preset latitude and the upper preset latitude are calculated, as shown in block 5 and in FIG. 6.

Next, two hyperbolas (assumed to be a linear equation) are determined, as shown in block 6.

Lastly, vehicle position coordinates (an intersection point of the two linear equations) are obtained, as shown in block 7.

The method of calculating vehicle position on the basis of time difference signals will be explained with reference to two example tables published by the U.S. Navy.

In the chart shown in FIG. 5(a), "9970-Y" on the upper left side means that this table is applicable for time differences between a Y-station transmitting a pulse signal of 99.7 μs in cyclic period and the master station. "T" is time difference, "Lat" means latitude, and "Long" means longitude. This table indicates that if the time difference is 6040.0 μs and the vehicle is at lat. 21 North, the hyperbola between master station and Y-station intersects at long. 135°44.4' East, as seen at the uppermost and leftmost numeral, where the numeral 10 on the right side is an interpolation constant.

Here, assumption is made that the time difference $T_{Dx}$ between M and X station is 35778.2 μs and the time difference $T_{Dy}$ between M and Y station is 60425.6 μs. When an approximate vehicle position is previously inputted to the position detection unit 3 (in this example, Latitude is between $Y_1=35°N$ and $Y_2=36°N$ Longitude is between $X_1=139°E$ and $X_2=140°E$), the intersection coordinates E (vehicle position) of two hyperbolas can be obtained in the following steps: (in this case, hyperbolas are assumed to be linear equations and, therefore, the linear interpolation method is used).

A. M-X (1) The nearest time difference data $T_x$ can be obtained from the table FIG. 5(b) as $T_x=35760$.

(2) As the intersection with $X_1=139°E$ in the table FIG. 5(b), a latitude (35°21.9'N) and an interpolation constant ($\Delta=8$) are obtained.

(3) The located point is next corrected on the basis of the following expression:

Corrected latitude of intersection point A (in FIG. 6) = $(T_{Dx} - T_x)(\Delta/100) + 35°21'9 = 35°21.16'N$ (4) In the same way, as the intersection with 140°E in the table FIG. 5(b), a latitude (35°16.0'N) and an interpolation constant ($\Delta = 8$) are obtained.

(5) The located point is next corrected on the basis of the following expression:

Corrected latitude of intersection point B (In FIG. 6) = $(T_{Dy} - T_y)(\Delta/100) + 35°16.0' = 35°15.26'N$

B. M-Y (1) The nearest time difference data $T_Y$ can be obtained from the table FIG. 5(a) as $T_y = 60420$.

(2) As the intersection with $Y_1$ in the table FIG. 5(a), a longitude (139°31.6'E) and an interpolation constant ($\Delta = 20$) are obtained.

(3) The located point is next corrected on the basis of the following expression:

Corrected longitude of intersection point C (in FIG. 6) = $(T_{Dy} - T_y)(\Delta/100) + 139°31.6' = 139°29.12'E$ (4) In the same way, as the intersection with $Y_2$ in the table FIG. 5(a), a longitude (139°56.6'E) and an interpolation constant ($\Delta = 22$) are obtained.

(5) The located point is next corrected on the basis of the following expression:

Corrected longitude of intersection point D (in FIG. 6) = $(T_{Dy} - T_y)(\Delta/100) + 139°56.6' = 139°58.49'E$

C. Vehicle position

By solving two simultaneous linear equations, a point of intersection (vehicle position) can be obtained as E = (139°37.66'E, 35°17.14'N).

Figure 7A:
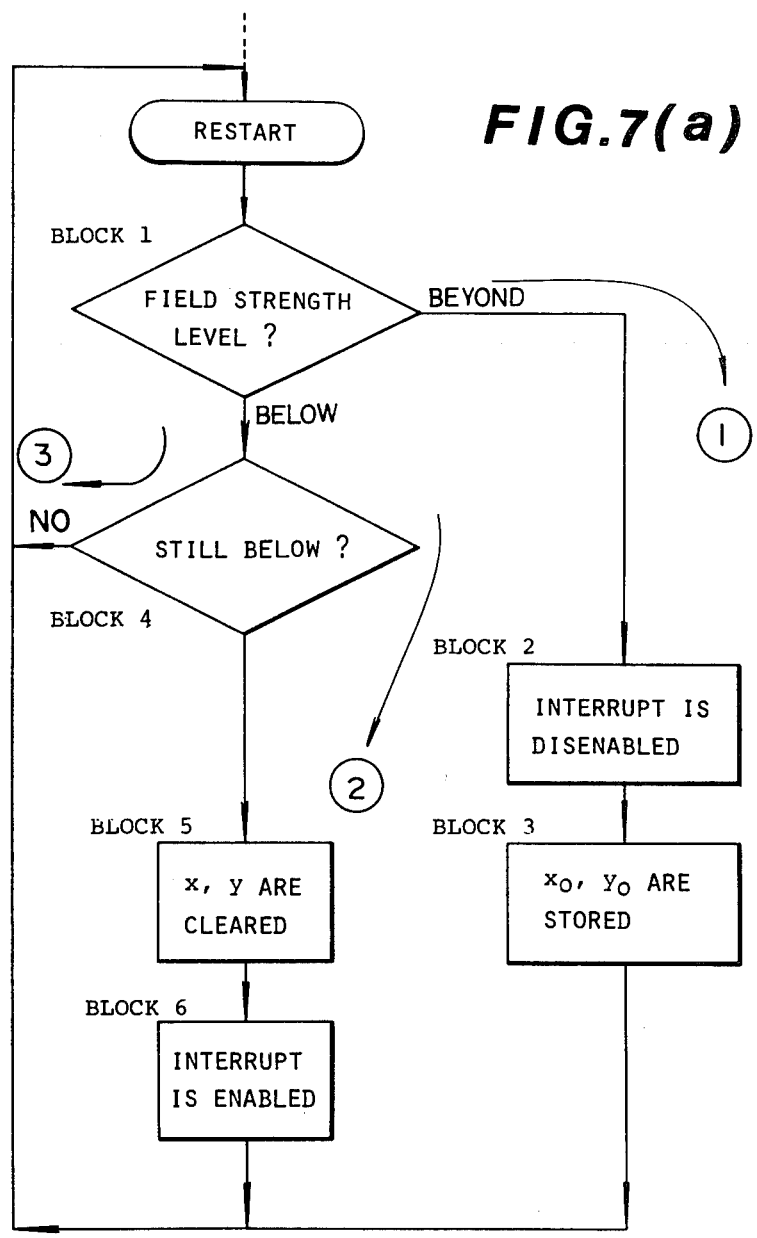
FIGS. 7 (a) and (b) are flowcharts for calculating a vehicle position on the basis of vehicle orientation and vehicle speed, that is, dead reckoning.
Figure 7B:
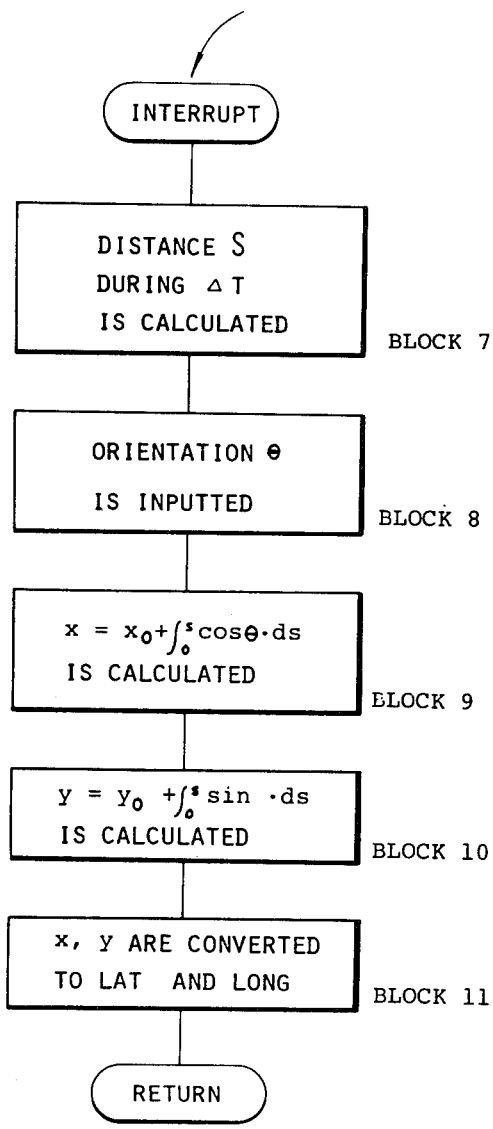

Now, a more detailed description will be made hereinbelow of dead reckoning. First, will be described the position calculating unit 7 configured as a microcomputer for calculating vehicle position (x, y) depending upon vehicle orientation and vehicle speed, with reference to the flowchart shown in FIG. 7.

The microcomputer in the position calculating unit 7 determines whether the levels of field strengths of the navigational wave signals are beyond or below a predetermined reference level, as shown in block 1. The state of field strengths is determined indirectly depending upon the switched position of the selector 8. That is to say, when the selector is set to the b-side in FIG. 3, the received level is beyond the reference level, the microcomputer disenables interrupts, as shown in block 2, and temporarily stores the vehicle position signals ($x_o$, $y_o$) generated by the position detection unit 3, as shown in block 3. When the selector is set to the a-side in FIG. 3; that is when one received level is below the reference level, the accumulated distance coordinates (x, y) are cleared as shown in block 5. In this case, if the received level returns to an acceptable level within a predetermined time period, the routine is restarted, looping from block 4 to the restart via the pass route (3). Otherwise, after the coordinates (x, y) are cleared, an interrupt routine initiable at a predetermined interval is enabled. This interrupt routine, shown in FIG. 7(b), actually performs the dead reckoning calculations as described later. Altough being not executed when the pass routes (1) and (3) are selected, the interruption is executed immediately after the coordinates are cleared as shown in blocks 5 and 6.

When the interrupt routine starts, an output signal indicative of a vehicle speed V generated from the vehicle speed sensor 6 is read to calculate a vehicle distance S over which the vehicle travels during $\Delta t$, as shown in block 7. Next, an output signal indicative of vehicle orientation $\theta$ generated by the magnetic compass 5 is inputted thereto, as shown in block 8. On the basis of these two data, the position (x, y) relative to a hypothetical starting point (a position where by one of the field strengths of navigational wave signals drops below a predetermined reference level) can be derived from the following expressions:

$$x = x_o + \int \cos \theta \, ds$$

$$y = y_o + \int \sin \theta \, ds$$

, as shown in blocks 9 and 10.

Next, the calculated coordinates are converted into the corresponding longitude and latitude, as shown in block 11.

In or near Tokyo, 1.0 minute in longitude corresponds to a distance of about 1512.5 m and 1.0 minute in latitude corresponds to a distance of about 1850.0 m. Therefore, by dividing the calculated values x and y by these distance and next adding the divided values to the starting point ($x_o$, $y_o$), it is possible to calculate the current vehicle position in the form of longitude and latitude.

As described above, the position calculating unit 7 is inoperative when the field strengths of navigational wave signals are all normal and is operative when any one of the field strengths of the navigational wave signals is abnormal. In other words, the system switches to the dead reckoning method when the received signals are inadequately strong. In this dead reckoning, the vehicle position is determined on the basis of signals generated by the magnetic compass and vehicle speed sensor with the positional data produced immediately before the switch-over being used as a new starting point.

Figure 8:
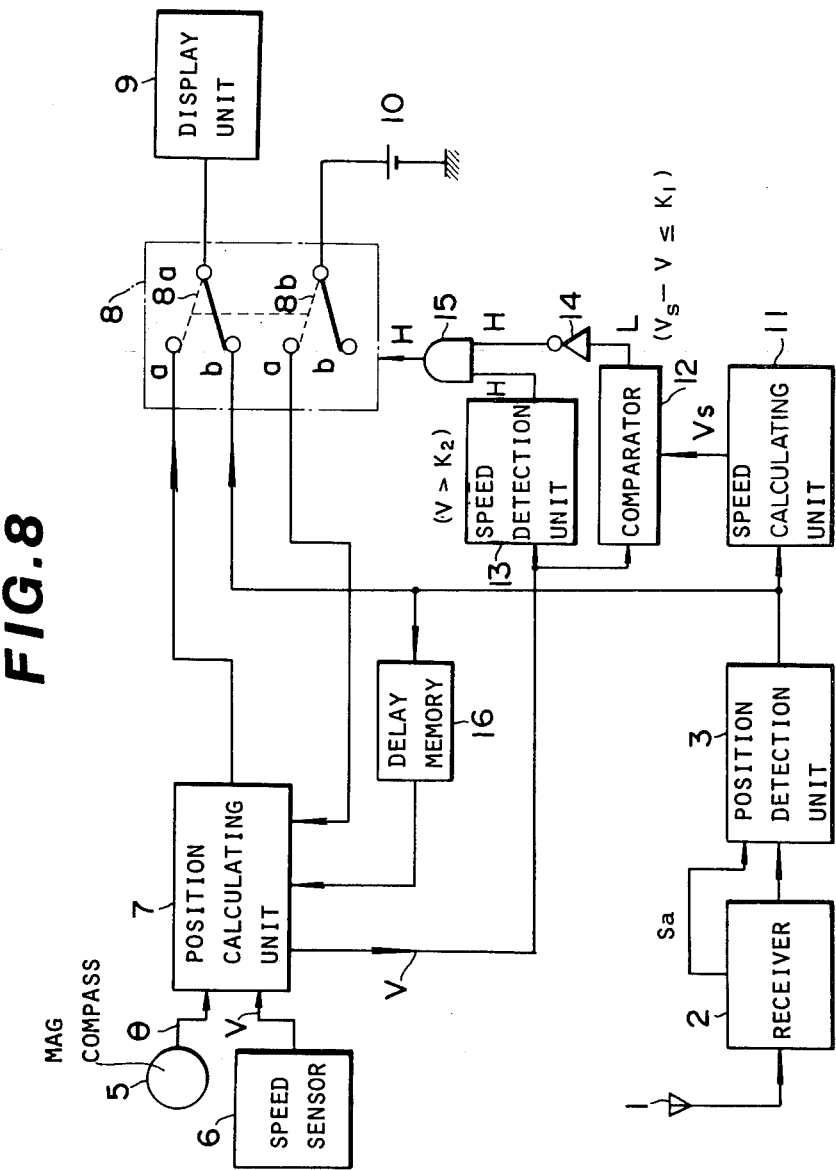
FIG. 8 is a schematic block diagram of a second embodiment of the vehicle guidance system according to the present invention, in which navigational electromagnetic wave signal method is switched to dead reckoning method when a speed calculating unit generates an abnormal pseudospeed signal.

FIG. 8 shows a schematic block diagram of a second embodiment according to the present invention. In the first embodiment shown in FIG. 3, the received state of navigational electromagnetic wave signals is determined from the standpoint of field strength; however, in this second embodiment, the position detection unit 3 will abruptly generate a signal indicative of a vehicle position with a large positive position error by the aid of a multiplier provided therein when a navigational electromagnetic wave signals weakens and drops below a predetermined lower limit. The pseudo-vehicle-speed (equivalent to 200–1000 km/H) calculated on this error position is compared with the actual vehicle speed V, and the position detection method is switched from navigational electromagnetic wave signal method to dead reckoning method if the two do not approximately agree.

In this embodiment, the above-mentioned signal indicative of error vehicle position, that is, pseudo-vehicle-speed is generated as follows:

(1) Since a level alarm section is usually provided in a loran-C receiving units 2 now on sale, when any one of the field strengths of the navigational wave signals drops below a lower limit, the receive unit 2 generates an alarm output signal Sa, via an output line separate from the normal output line, to the position detection unit 3.

(2) In response to this alarm signal Sa, since a multiplier provided in the position detection unit 3 is triggered so as to multiply the vehicle position value calculated by the position detection unit 3, the unit 3 generates an abnormal signal indicative of a vehicle position with a large position error.

(3) Next, the pseudo-vehicle-speed (200–1000 km/H) is calculated by a speed calculating unit 11 on the basis of this abnormal signal.

(4) The pseudo-vehicle-speed calculated on this abnormal vehicle position signal is compared with the actual vehicle speed V.

To explain this second embodiment in more detail, first, the respective position detection sections based on navigational electromagnetic wave signals and dead reckoning are the same as in the first embodiment shown in FIG. 3; however, this guidance system further comprises a speed calculating unit 11 for detecting a vehicle speed $V_s$ on the basis of the expression $$V_s = \frac{1}{dt} \sqrt{dx^2 + dy^2}$$

where dx and dy values are derived from two most recent position detection signal from the position detection unit 3, and a comparator 12 for comparing the vehicle speed $V_s$ calculated by the speed calculating unit 11 with the actual vehicle speed V from the vehicle sensor 6 and outputting an H-voltage signal when the difference in vehicle speed between $V_s$ and V exceeds a reference value $K_1$. By this H-voltage output signal from the comparator 12, the selector 8 is switched from the b-side to the a-side. Further, in this embodiment, even if only the output of the comparator 12 changes to a H-voltage level, the selector is kept as it is explained later. Furthermore, since a constant time interval (response delay) is inherent in switching the selector 8 after vehicle speed $V_s$ is calculated by the speed calculating unit 11 and the selector 8 receives the H-voltage output signal, if the output signal from the position detection unit 3 at that time is directly used to preset the position calculating unit 7, there will be a relatively large error in the initial position $(x_o, y_o)$. To overcome this problem, a delay memory 16 is further provided between the position detection unit 3 and the position calculating unit 7 to delay the position detection data by a predetermined time period, so that the data before an abnormal state is detected can be used to preset these initial values.

When the position detection unit 3 detects an abnormal position while navigational electromagnetic wave signals are weak and the vehicle is stopped, both the calculated vehicle speed $V_s$ and the actual vehicle speed V are set to zero and the output of the comparator 12 returns to a L-voltage signal. Therefore, if the switching is controlled only by the output signal from the comparator 12, an error output signal from the position detection unit 3 will be displayed. In order to prevent this error, there is further provided a vehicle speed detection unit 13 for outputting a H-voltage output signal when the actual vehicle speed V exceeds a predetermined reference value $k_2$ indicative of vehicle motion. The output signal from the vehicle speed detection unit 13 and the output signal from the comparator 12, after being inverted through an inverter 14, are inputted to an AND gate 15, so that the selector contacts 8a and 8b of the selector 8 are switched to the a-side whenever the vehicle is stopped and navigational electromagnetic wave signals are only weakly received. In this embodiment, it is preferable to use a RS flip-flop (a semiconductor on-off switch) as the selector 8.

Now, will be described the operation of the second embodiment according to the present invention shown in FIG. 8.

First, in the case where three strong navigational electromagnetic wave signals are received and the vehicle is moving, since $V_s$ is roughly the same as V, $(V_s - V)$ is equal to or smaller than a first constant $k_1$, and thus the output signal of the comparator 12 is at a L-voltage. In addition, since V is larger than the second constant $k_2$, the output signal of the speed detection unit 13 is at a H-voltage level. Therefore, the H-voltage output signal inverted through the inverter 14 and the H-voltage output signal from the speed detection unit 13 generate a H-voltage output signal from the AND gate 15, thus the selector contacts 8a and 8b of the selector 8 are switched to the b-side as shown by the solid lines in FIG. 4.

Therefore, the display unit 9 displays a vehicle position on the basis of a position detection signal (x, y) obtained by the position detection unit 3 on the basis of navigational electromagnetic wave signals. In this embodiment, the position detection signal (x, y) is inputted to the position calculating unit 7 for presetting the initial position, after being delay by a predetermined time period by the delay memory 16.

In such a vehicle position detection state depending upon navigational electromagnetic wave signals, if any of the navigational electromagnetic wave signals from the fixed stations weaken excessively, the position detection unit 3 starts error-operation, that is, outputs an error position detection signal, so that the speed calculating unit 11 calculates a pseudo-speed of about 200–1000 km/H. As a result, the calculated vehicle speed $V_s$ from the speed calculating unit 11 becomes greatly different from the actual vehicle speed V, that is, $(V_s - V) > k_1$, and the comparator 12 outputs a H-voltage output signal. When the comparator 12 generates a H-voltage output signal, since the inverter outputs a L-voltage signal and thus the output signal of the AND gate is a L-voltage level, the selector contacts 8a and 8b of the selector 8 are switched to the a-side and power from the DC power supply 10 activates the position calculating unit 7. The position calculating unit 7 receives a position detection signal from the delay memory 16, which is generated a predetermined time period before as its initial value $(x_o, y_o)$, executes necessary calculations on the basis of a vehicle orientation signal $\theta$ detected by the magnetic compass 5 and a vehicle speed signal V detected by the vehicle speed sensor 6 and the expression already explained, and applies a position detection signal obtained via the so-called dead reckoning method to the display unit 9 in order to indicate the current vehicle position.

Next, when all three navigational electromagnetic wave signals return to a normal condition, the output signal of the AND gate 15 returns also to a H-voltage; the selector contacts 8a and 8b of the selector 8 are switched to the b-side; the vehicle position is determined via the navigational electromagnetic wave signal method.

On the other hand, when the vehicle is stopped and at least one navigational electromagnetic wave signal is excessively weak, the calculated vehicle speed $V_s$ and the actual vehicle speed V are both zero; since $V_s - V \leq K_1$, the output from the comparator 12 changes from a H-voltage to a L-voltage which corresponds to a normal condition; therefore, a H-voltage signal is inputted to the AND gate 15 through the inverter 14. In this case, however, since the speed detection unit 13 outputs a L-voltage because of $V<k_2$, the output of the AND gate 15 is kept at a L-voltage, and thus the selector 8 remains at the a-side. As a result, the errant position calculated on the basis of navigational wave signals will not be displayed even if the vehicle is stopped when navigational electromagnetic wave signals are not received normally.

As described above, in the second embodiment shown in FIG. 8, since the position calculated depending upon dead reckoning is switched not when navigational electromagnetic wave signals attenuate but when an abnormal position detection signal due to navigational electromagnetic wave signal attenuation is detected, it is possible to fully utilize high-accurate position detection depending upon navigational electromagnetic wave signals even if the field strength of the signal drops lower than in the first embodiment, without hunting.

The operations of the second embodiment according to the present invention have been roughly described hereinabove. A more detailed description will be made hereinbelow of the respective units.

The position detection unit 3 is the same as in the first embodiment except that there is further provided a multiplier for generating an error vehicle position signal each time an alarm output signal Sa is inputted thereto.

Figure 9:
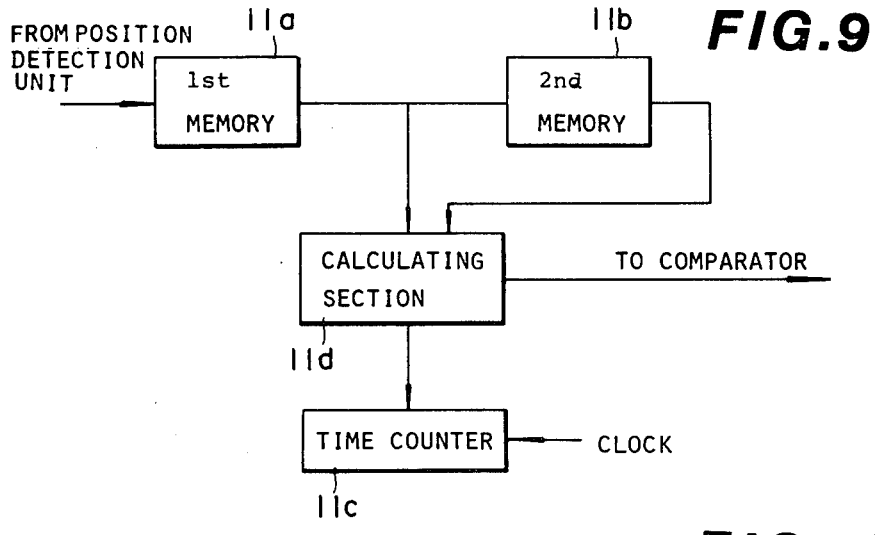
FIG. 9 is a schematic block diagram of a speed calculating unit used with the second embodiment of the vehicle guidance system according to the present invention.

The speed calculating unit 11, as shown in FIG. 9, comprises a first memory unit 11a for storing the most recent vehicle position data (x, y) from the position detection unit 3, a second memory unit 11b for storing the preceding vehicle position data (x', y'), a time counter 11c for determining each calculating time period t, and a calculating section 11d for calculating vehicle speed on the basis of the following expression $$\frac{\sqrt{(x'-x)^2 + (y'-y)^2}}{t}$$

and for outputting a signal corresponding thereto. Further, in this unit 11, clock pulses are continuously inputted to the time counter 11c, as shown in FIG. 9.

Figure 10:
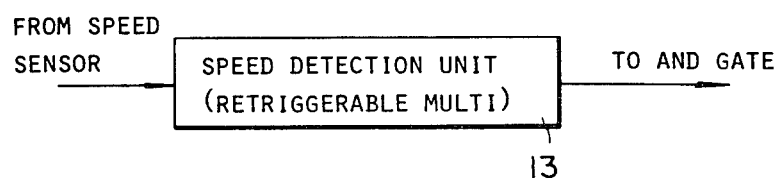
FIG. 10 is a schematic block diagram of a speed detection unit C (a retriggerable monostable multivibrator) used with the second embodiment of the vehicle guidance system according to the present invention.

As shown in FIG. 10, the speed detection unit 13 is a retriggerable monostable multivibrator.

A pulse train having a cyclic period proportional to vehicle speed is received from the vehicle speed sensor 6 through the position calculating unit 7. Therefore, since the time constant of the multivibrator is chosen equal to the cyclic period of the pulse train when the vehicle is travelling at a speed $k_2$, when vehicle speed exceeds $k_2$, the multivibrator is triggered before its output returns to the L-voltage level, so that the output is held at a H-voltage level. When vehicle speed is below $k_2$, the output periodically returns to a L-voltage level.

Figure 11:
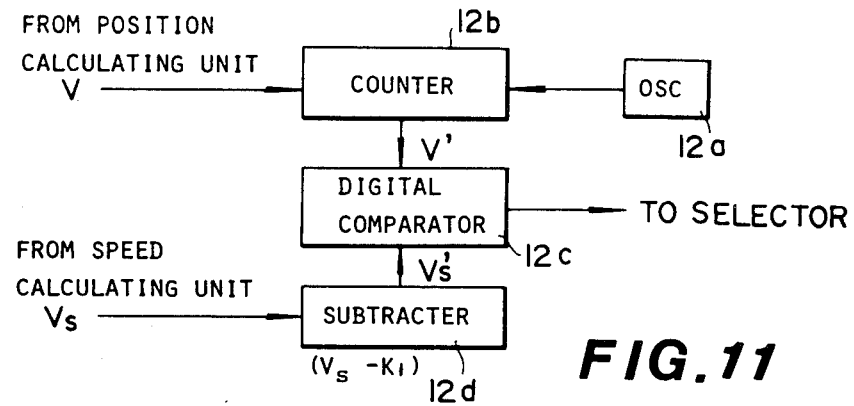
FIG. 11 is a schematic block diagram of a speed comparator used with the second embodiment of the vehicle guidance system according to the present invention.

As shown in FIG. 11, the comparator 12 comprises an oscillator 12a for generating a clock signal with which to count the pulse period of vehicle speed signal V, a counter 12b for counting the vehicle speed signal V in terms of the clock signal, a subtractor 12d for executing the subtraction $(V_s-k_1)$ and for outputting a signal corresponding to the subtraction, and a digital comparator 12c for comparing the signal $(V_s-k_1)$ with the vehicle speed signal V and for outputting an L-voltage signal when $V_s-k_1<V$ and a H-voltage signal when $V_s-k_1>V$.

Further, the delay memory unit 16 is the same as the second memory unit 11b in the speed calculating unit 11.

Figure 12:
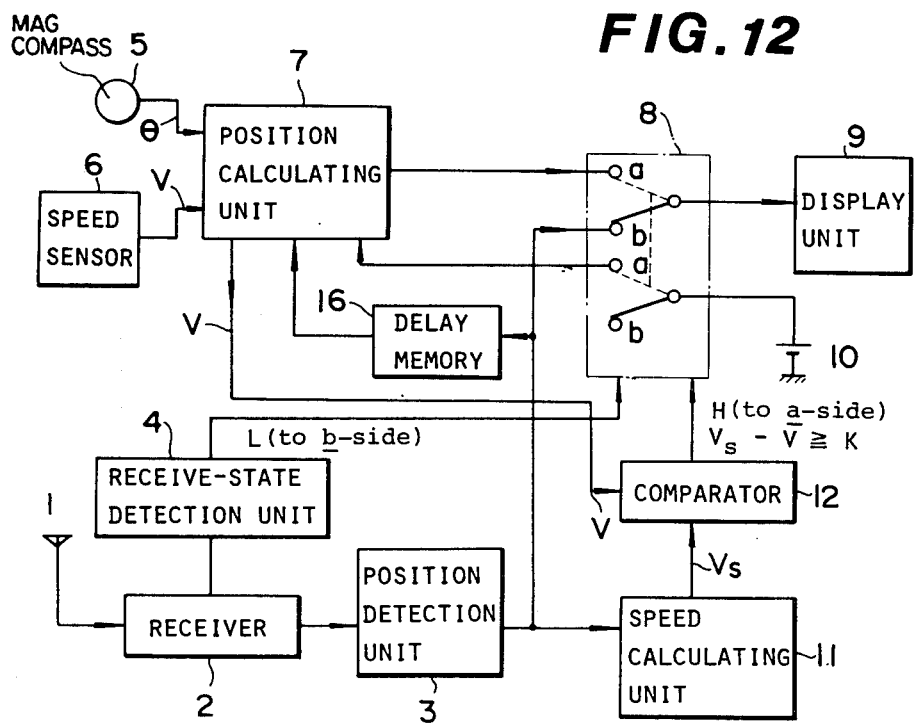
FIG. 12 is a schematic block diagram of a third embodiment of the vehicle guidance system according to the present invention, in which navigational electromagnetic wave signal method is switched to dead reckoning method when the speed calculating unit generates an abnormal pseudo-speed signal as in the second embodiment, and the dead reckoning method is switched back to the navigational electromagnetic wave signal method when the receive-state detection unit detects an abnormal receive signal as in the first embodiment.

FIG. 12 shows a schematic block diagram of a third embodiment according to the present invention.

In this third embodiment, the switch-over to dead reckoning method, that is, the switch-over to the output signal from the position calculating unit 7, when navigational electromagnetic wave signals weaken and therefore an abnormal position detection signal is outputted, is performed by the speed calculating unit 11 and the comparator 12 in the same manner as in the second embodiment shown in FIG. 8. On the other hand, the state in which navigational electromagnetic wave signals are received strongly is detected by the receive-state detection unit 4 used in the first embodiment shown in FIG. 3. As compared with the second embodiment shown in FIG. 8, it is possible to simplify the circuit configuration.

In more detail, in the case where navigational electromagnetic wave signals are received normally, the receive-state detection unit 4 generates a L-voltage output signal to switch the selector contacts 8a and 8b of the selector 8 to the b-side. In this condition, when navigational electromagnetic wave signals weaken and, therefore, the position detection signal from the position detection unit 3 becomes abnormal, since the difference between calculated speed $V_s$ and actual speed V exceeds $k_1$, the comparator 12 outputs a H-voltage signal to switch the selector contacts 8a and 8b of the selector 8 to the a-side. At the same time, power is applied to the position calculating unit 7 from the DC power supply 10, and, therefore, position calculation is executed according to the dead reckoning method after the position detected a predetermined time period previously is inputted from the delay memory 16 to set the initial value $(x_o, y_o)$.

As described above, according to the present invention, in the method of detecting vehicle positions on the basis of the difference in receive time between navigational electromagnetic wave signals synchronously transmitted from at least three fixed stations and of displaying the vehicle positions on a map, when any of the field strengths of the received navigational electromagnetic wave signals drops below a predetermined level, the position calculation is switched over to a method based on vehicle travel orientation and vehicle speed in conjunction with the last detected vehicle position. Thus, it is possible to display the current vehicle position continuously even if navigational electromagnetic wave signals are obstructed as the vehicle travels through a city or mountains. Further, although the vehicle position calculations on the basis of vehicle orientation and vehicle speed readily accumulates systematic error, since it is possible to reset the initial vehicle position each time the second method is employed, the accumulated error is cancelled whenever navigational electromagnetic wave signals are received normally, thus realizing an accurate vehicle position display via navigational electromagnetic wave signal method.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A method of guiding an automotive vehicle in accordance with at least three navigational electromagnetic wave signals transmitted from at least three fixed stations, which comprises the following steps:
   (a) receiving the at least three navigational electromagnetic wave signals synchronously transmitted from the at least three fixed stations;
   (b) detecting the differences in receive time between two pairs of said at least three navigational electromagnetic wave signals;
   (c) determining at least two hyperbolas in accordance with the detected differences in receive time between the pairs of navigational electromagnetic wave signals;
   (d) calculating a point of intersection of the at least two determined hyperbolas to obtain a vehicle position on the basis of navigational electromagnetic wave signals;
   (e) storing sequentially the vehicle position calculated on the basis of navigational electromagnetic wave signals;
   (f) detecting vehicle orientation in which the vehicle is travelling;
   (g) detecting vehicle speed at which the vehicle is travelling;
   (h) calculating a distance over which the vehicle has travelled in accordance with the detected vehicle orientation and the detected vehicle speed;
   (i) adding the distance calculated on the basis of detected vehicle orientation and detected vehicle speed to the current stored vehicle position calculated on the basis of navigational electromagnetic wave signals in order to obtain a vehicle position calculated on the basis of detected vehicle orientation and detected vehicle speed;
   (j) detecting the field strengths of the at least three navigational electromagnetic wave signals;
   (k) comparing the detected field strengths with a predetermined lower limit; and
   (l) selecting and displaying the vehicle position calculated on the basis of navigational electromagnetic wave signals when the detected field strengths are all beyond the predetermined lower limit and the vehicle position calculated on the basis of detected vehicle orientation and detected vehicle speed when any one of the detected field strengths is below the predetermined lower limit.

2. A method of guiding an automotive vehicle in accordance with at least three navigational electromagnetic wave signals transmitted from at least three fixed stations, which comprises the following steps:
   (a) receiving the at least three navigational electromagnetic wave signals synchronously transmitted from the at least three fixed stations;
   (b) detecting the differences in receive time between two pairs of said at least three navigational electromagnetic wave signals;
   (c) determining at least two hyperbolas in accordance with the detected difference in receive time between the pairs of navigational electromagnetic wave signals;
   (d) calculating a point of intersection of the at least two determined hyperbolas to obtain a vehicle position on the basis of navigational electromagnetic wave signals;
   (e) storing sequentially the vehicle position calculated on the basis of navigational electromagnetic wave signals;
   (f) detecting vehicle orientation in which the vehicle is travelling;
   (g) detecting vehicle speed at which the vehicle is travelling;
   (h) calculating a distance over which the vehicle has travelled in accordance with the detected vehicle orientation and the detected vehicle speed;
   (i) adding the distance calculated on the basis of detected vehicle orientation and detected vehicle speed to the current stored vehicle position calculated on the basis of navigational eleectromagnetic wave signals in order to obtain a vehicle position calculated on the basis of detected vehicle orientation and detected vehicle speed;
   (j) detecting the field strengths of the at least three navigational electromagnetic wave signals;
   (k) comparing the detected field strengths with a predetermined lower limit;
   (l) generating a signal indicative of an erroneous vehicle position on the basis of navigational electromagnetic wave signals when any one of the detected field strengths is below the predetermined lower limit;
   (m) calculating the vehicle speed according to the generated signal indicative of the erroneous vehicle position calculated on the basis of navigational electromagnetic wave signals;
   (n) comparing the calculated vehicle speed with the detected vehicle speed and generating an output signal indicative thereof; and
   (o) selecting and displaying the vehicle position calculated on the basis of navigational electromagnetic wave signals when the difference between the calculated vehicle speed and the detected vehicle speed is less than a predetermined amount and the vehicle position calculated on the basis of detected vehicle orientation and detected vehicle speed when the calculated vehicle speed is greater than the detected vehicle speed by said predetermined amount.

3. A method of guiding an automotive vehicle in accordance with at least three navigational electromagnetic wave signals transmitted from at least three fixed stations as set forth in claim 2, which further comprises the following steps of:
   (a) comparing the detected vehicle speed with a reference vehicle speed;
   (b) generating an output signal when the detected vehicle speed is greater than the reference speed and no signal when the detected vehicle speed is equal to or smaller than the reference speed;
   (c) inverting the output signal generated when the calculated vehicle speed signal is compared with the detected vehicle speed; and
   (d) ANDing the output signal generated when the detected vehicle speed is compared with the reference vehicle speed and the inverted output signal in order to select and to output the vehicle position calculated on the basis of navigational electromagnetic wave signals when the difference between the calculated vehicle speed and the detected vehicle speed is less than said predetermined amount and when the detected vehicle speed is greater than the reference speed, and the vehicle position calculated on the basis of detected vehicle orientation and detected vehicle speed when the calculated vehicle speed is greater than the detected vehicle speed by said predetermined amount or when the detected vehicle speed is smaller than the reference speed.

4. A system of guiding an automotive vehicle in accordance with at least three navigational electromagnetic wave signals transmitted from at least three fixed stations, which comprises:

(a) a receiver for receiving the at least three navigational electromagnetic wave signals synchronously transmitted from the at least three fixed stations and for generating signals corresponding thereto;

(b) a position detection unit connected to said receiver for detecting differences in receive time between at least two pairs of said at least three navigational electromagnetic wave signals, for determining at least two hyperbolas in accordance with the detected difference in receive time, for calculating a point of intersection of the at least two determined hyperbolas, and for outputting a signal indicative of a vehicle position calculated on the basis of said navigational electromagnetic wave signals;

(c) a vehicle orientation sensor for detecting vehicle orientation in which the vehicle is travelling and for outputting signals corresponding thereto;

(d) a vehicle speed sensor for detecting vehicle speed at which the vehicle is travelling and for outputting signals corresponding thereto;

(e) a position calculating unit connected to said vehicle orientation sensor, said speed sensor, and said position detection unit for calculating a distance over which the vehicle has travelled in accordance with the detected vehicle orientation and the detected vehicle speed, for sequentially storing the vehicle position calculated on the basis of navigational wave signals, for adding the distance calculated on the basis of detected vehicle orientation and detected vehicle speed to the current stored vehicle position calculated on the basis of navigational electromagnetic wave signals, and for outputting a signal indicative of a vehicle position calculated on the basis of detected vehicle orientation and detected vehicle speed;

(f) a receive-state detection unit connected to said receiver for detecting field strengths of the at least three navigational electromagnetic wave signals, for comparing the detected field strengths with a predetermined lower limit, and for outputting no signal when the detected field strengths are all beyond the lower limit and for outputting an output signal when any one of the detected field strengths is below the lower limit;

(g) a selector connected to said position calculating unit, said position detection unit, and said receive-state detection unit for selecting the signal generated from said position detection unit when said receive-state detection unit outputs no signal and the signal generated from said position calculating unit when said receive-state detection unit outputs an output signal; and (h) a display unit connected to said selector for receiving said selected signal for displaying the signals generated from said position detection unit and from said position calculating unit;

whereby the vehicle positions are displayed on the basis of navigational electromagnetic wave signals when the field strengths are all beyond the predetermined lower limit and on the basis of detected vehicle orientation and detected vehicle speed when any one of the field strengths is below the predetermined lower limit.

5. A system of guiding an automotive vehicle in accordance with at least three navigational electromagnetic wave signals transmitted from at least three fixed stations, which comprises:

(a) a receiver for receiving the at least three navigational electromagnetic wave signals synchronously transmitted from the at least three fixed stations, for detecting field strengths of said received signals, for comparing the detected field strengths with a predetermined lower limit, and for generating signals corresponding to the results of said comparison;

(b) a position detection unit connected to said receiver for detecting differences in receive time between at least two pairs of said at least three navigational electromagnetic wave signals, for determining at least two hyperbolas in accordance with the detected differences in receive time, for calculating a point of intersection of the at least two determined hyperbolas, for outputting signals indicative of a vehicle position calculated on the basis of navigational wave signals when the field strengths of the navigational electromagnetic wave signals are all beyond said predetermined lower limit and signals indicative of an erroneous vehicle position when any one of the detected field strengths is below the predetermined lower limit;

(c) a vehicle orientation sensor for detecting vehicle orientation in which the vehicle is travelling and for outputting signals corresponding thereto;

(d) a vehicle speed sensor for detecting vehicle speed, V, at which the vehicle is travelling and for outputting signals corresponding thereto;

(e) a memory connected to said position detection unit for storing the signals from said position detection unit and outputting same after a predetermined delay;

(f) a position calculating unit connected to said vehicle orientation sensor, said vehicle speed sensor, and said memory, for calculating a distance over which the vehicle has travelled in accordance with the detected vehicle orientation and the detected vehicle speed, for sequentially receiving the outputted signals from the memory, for adding the distance calculated on the basis of detected vehicle orientation and detected vehicle speed to the stored vehicle position represented by said outputted signals from said memory, and for outputting a signal indicative of a vehicle position calculated on the basis of detected vehicle orientation and detected vehicle speed;

(g) a speed calculating unit connected to said position detection unit for calculating vehicle speed Vs according to the output signals from said position detection unit indicative of the vehicle position calculated on the basis of navigational electromagnetic wave signals;

(h) a comparator connected to said position calculating unit and said speed calculating unit for comparing the calculated vehicle speed with the detected vehicle speed and for outputting no signal when the difference between the calculated vehicle speed and the detected vehicle speed is less than a predetermined amount and an output signal when the calculated vehicle speed is greater than the detected vehicle speed by said predetermined amount;

(i) a selector connected to said position calculating unit, said position detection unit, and said comparator for selecting the signal generated from said position detection unit when said comparator outputs no signal and the signal generated from said position calculating unit when said comparator outputs an output signal;

(j) a display unit connected to said selector for receiving said selected signal and for displaying the selected signals;

whereby the vehicle positions are displayed on the basis of navigational electromagnetic wave signals when the field strengths are all beyond the predetermined lower limit and on the basis of detected vehicle orientation and detected vehicle speed when any one of the field strengths is below the predetermined lower limit.

6. A system of guiding an automotive vehicle in accordance with at least three navigational electromagnetic wave signals transmitted from at least three fixed stations as set forth in claim 5, which further comprises:

(a) a speed detection unit connected to said position calculating unit for comparing the detected vehicle speed with a reference vehicle speed, and for generating an output signal when the detected vehicle speed is greater than the reference speed and no signal when the detected vehicle speed is equal to or smaller than the reference speed;

(b) an inverter connected to said comparator for inverting the output signal generated from said comparator and for outputting an inverted signal;

(c) an AND gate connected to said speed detection unit and said inverter for ANDing the output signal from said speed detection unit and the inverted signal from said inverter and for outputting an ANDed signal to said selector to select the signal from said position detection unit when the difference between the calculated vehicle speed and the detected vehicle speed is less than said predetermined amount and when the detected vehicle speed is greater than the reference speed, and to select the signal from said position calculating unit when the calculated vehicle speed is greater than the detected vehicle speed by said predetermined amount or when the detected vehicle speed is smaller than the reference speed.

7. A system of guiding an automotive vehicle in accordance with at least three navigational electromagnetic wave signals transmitted from at least three fixed stations as set forth in claim 5 which further comprises a receive-state detection unit connected between said receiver and said selector, for detecting the field strengths of the at least three navigational electromagnetic wave signals, for comparing the detected field strength with said predetermined lower limit, and for outputting no signal to said selector to select the signal generated from said position detection unit only when said receive-state detection unit detects that the field strengths of said navigational electromagnetic wave signals are all beyond the predetermined limit, whereby vehicle positions are switched from display on the basis of navigational electromagnetic wave signals to display on the basis of detected vehicle orientation and detected vehicle speed only when said comparator outputs an output signal, and from the display on the basis of detected vehicle orientation and detected vehicle speed to the display on the basis of navigational electromagnetic wave signals only when said receive-state detection unit outputs no signal.

8. A system of guiding an automotive vehicle in accordance with at least three navigational electromagnetic wave signals transmitted from at least three fixed stations as set forth in claim 5, wherein said speed calculating unit comprises:

(a) a first memory unit connected to said position detection unit for storing a most current value (x,y) of said vehicle position signals generated from said position detection unit;

(b) a second memory unit connected to said first memory for storing the preceding value (x',y') of said most current value of said vehicle position signals generated from said position detection unit;

(c) a time counter for determining calculating time periods t;

(d) a calculating section connected to said first and second memory units, said time counter and said comparator for calculating vehicle speed on the basis of $$(x'-x)^2+(y'-y)/t$$

and for outputting a signal corresponding to said vehicle speed Vs.

9. A system of guiding an automotive vehicle in accordance with at least three navigational electromagnetic wave signals transmitted from at least three fixed stations as set forth in claim 5, wherein said comparator comprises:

(a) an oscillator for generating clock signals;

(b) a counter connected to said oscillator and said position calculating unit for counting a number of clock signals proportional to said detected vehicle speed;

(c) a subtractor connected to said speed calculating unit for subtracting a constant $K_1$ from the vehicle speed Vs calculated by said speed calculating unit and for outputting a signal corresponding to the subtraction; and (d) said comparator being a digital comparator connected to said counter, said subtractor, and said selector, for comparing the subtraction with the detected vehicle speed V, and for outputting said comparator output signal, when the subtraction is equal to or greater than the detected vehicle speed V, to said selector.

10. A system of guiding an automotive vehicle in accordance with at least three navigational electromagnetic wave signals transmitted from at least three fixed stations as set forth in claim 6, wherein said speed detection unit connected between said position calculating unit and said AND gate is a retriggerable monostable multivibrator.

* * * * *